(12) United States Patent
Saeki et al.

(10) Patent No.: US 9,013,149 B2
(45) Date of Patent: Apr. 21, 2015

(54) ELECTRONIC APPARATUS, METHOD FOR CONTROLLING ELECTRONIC APPARATUS, COMPUTER PROGRAM, AND RECORDING MEDIUM

(75) Inventors: Takeshi Saeki, Osaka (JP); Takanori Yamamoto, Nara (JP); Takashi Shirakawa, Ehime (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 466 days.

(21) Appl. No.: 13/390,246

(22) PCT Filed: Dec. 27, 2010

(86) PCT No.: PCT/JP2010/007547
§ 371 (c)(1),
(2), (4) Date: Feb. 13, 2012

(87) PCT Pub. No.: WO2011/080915
PCT Pub. Date: Jul. 7, 2011

(65) Prior Publication Data
US 2012/0139503 A1 Jun. 7, 2012

(30) Foreign Application Priority Data

Dec. 28, 2009 (JP) .................................. 2009-297398

(51) Int. Cl.
*H01M 10/44* (2006.01)
*H01M 10/46* (2006.01)
(Continued)

(52) U.S. Cl.
CPC .................. *H04N 5/232* (2013.01); *G03B 7/26* (2013.01); *G03B 17/02* (2013.01);
(Continued)

(58) Field of Classification Search
CPC ........................................................ H02J 7/0054
USPC ........................... 320/162, 103, 127, 128, 132
See application file for complete search history.

(56) References Cited

U.S. PATENT DOCUMENTS 6,665,801 B1 * 12/2003 Weiss .............................. 713/300
7,069,347 B1 * 6/2006 Kolokowsky ...................... 710/8
(Continued)

FOREIGN PATENT DOCUMENTS

CN 1989477 A 6/2007
EP 2 051 157 A1 4/2009
(Continued)

OTHER PUBLICATIONS

Extended European Search Report for corresponding European Application No. 10840774.3 dated Dec. 3, 2013.
(Continued)

*Primary Examiner* — Edward Tso
(74) *Attorney, Agent, or Firm* — Renner, Otto, Boisselle & Sklar, LLP

(57) ABSTRACT

The present invention provides an electronic device that can operate as long as possible even if the battery level is low and that can avoid an unexpected shutdown as much of the time as possible while data is being transmitted to, or received from, an external device.
The electronic device has a particular mode of operation in which the electronic device is connected to an external device and can accept a request to read and/or write information sent by the external device. The electronic device includes: a battery; an interface, which is connected to the external device so as to get power from the external device and which accepts the request sent by the external device; and a control section for changing conditions for enabling that particular mode of operation according to a supply value, which is at least one of the values of current and voltage supplied by the external device, and a value representing a level of the battery.

8 Claims, 4 Drawing Sheets

(51) Int. Cl.
   *H04N 5/232*   (2006.01)
   *G03B 7/26*    (2006.01)
   *G03B 17/02*   (2006.01)
   *G06F 1/26*    (2006.01)
   *G06F 1/32*    (2006.01)

(52) U.S. Cl.
   CPC ........... *H04N 5/23241* (2013.01); *G06F 1/263* (2013.01); *G06F 1/266* (2013.01); *G06F 1/3212* (2013.01); *Y02B 60/1292* (2013.01)

(56) References Cited

U.S. PATENT DOCUMENTS

| | | | | |
|---|---|---|---|---|
| 7,523,338 | B2 * | 4/2009 | Fu et al. | 713/340 |
| 7,550,877 | B2 * | 6/2009 | Masui et al. | 307/126 |
| 7,984,318 | B2 * | 7/2011 | Fu et al. | 713/340 |
| 8,001,400 | B2 * | 8/2011 | Fadell | 713/320 |
| 8,700,934 | B2 * | 4/2014 | Book et al. | 713/322 |
| 2002/0037743 | A1 | 3/2002 | Takahashi | |
| 2002/0177475 | A1 | 11/2002 | Park | |
| 2009/0210739 | A1 * | 8/2009 | Fu et al. | 713/340 |

FOREIGN PATENT DOCUMENTS

| | | |
|---|---|---|
| JP | 2002-191079 A | 7/2002 |
| JP | 2004-280747 A | 10/2004 |
| JP | 2006-203689 A | 8/2006 |
| JP | 2006-352255 A | 12/2006 |
| WO | WO 2006/019850 A2 | 2/2006 |
| WO | WO 2008/038057 A1 | 4/2008 |

OTHER PUBLICATIONS

Chinese Search Report for corresponding Chinese Application No. 201080005752.7 dated Apr. 17, 2014 (with partial English translation).

International Search Report for corresponding International Application No. PCT/JP2010/007547 mailed Feb. 22, 2011.

Form PCT/ISA/237 and partial English translation for International Application No. PCT/JP2010/007547 dated Feb. 22, 2011.

* cited by examiner

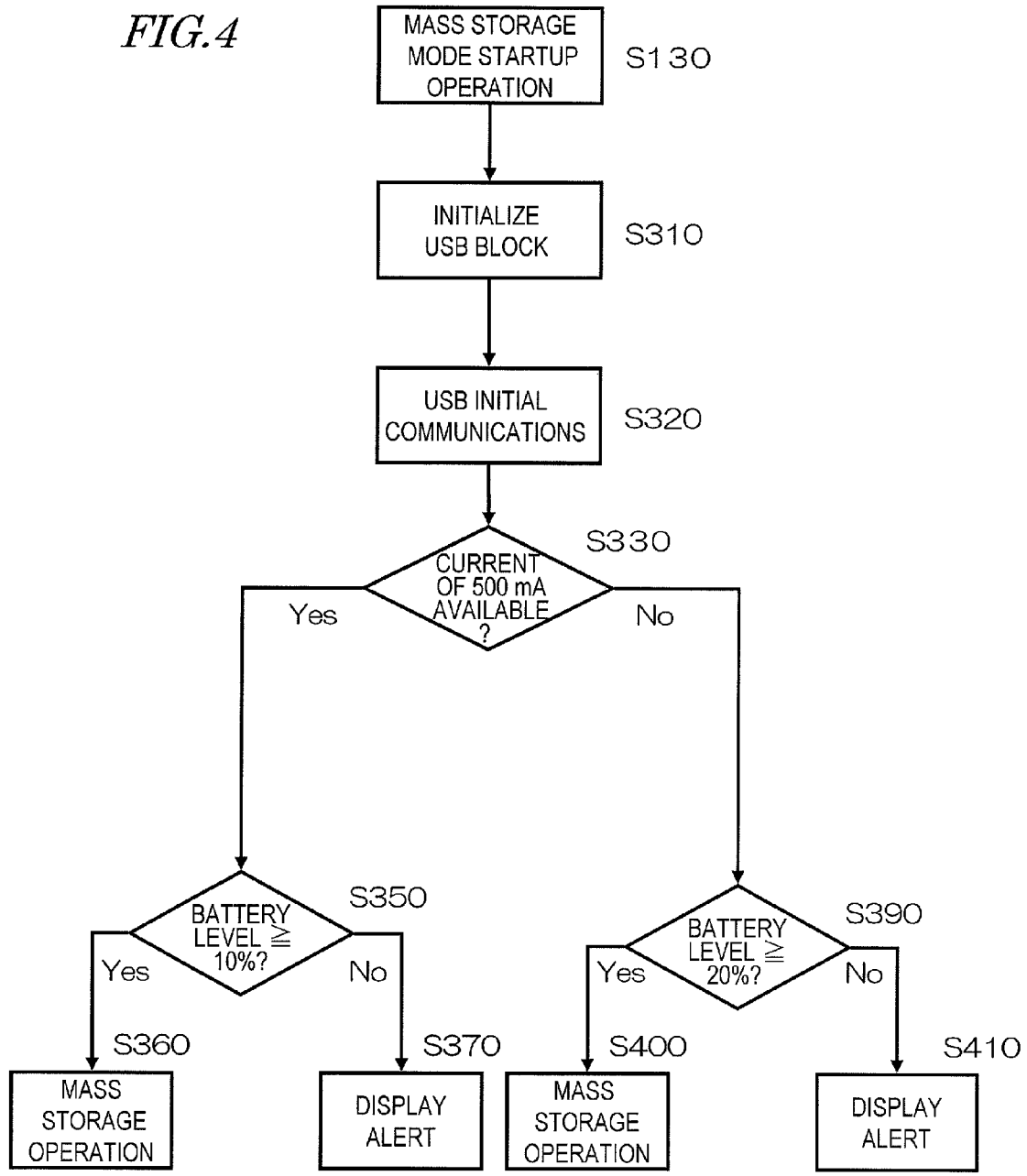

ELECTRONIC APPARATUS, METHOD FOR CONTROLLING ELECTRONIC APPARATUS, COMPUTER PROGRAM, AND RECORDING MEDIUM

TECHNICAL FIELD

The present invention relates to an electronic device, and more particularly relates to an electronic device, of which the battery can be selectively charged with the power that has been supplied from one of two or more power supplies.

BACKGROUND ART

Patent Document No. 1 discloses an image input system in which a digital camera and a computer are connected together. In that system, in accordance with a command that has been received from the computer, the digital camera determines whether power should be supplied from an external power supply or a USB bus power. The computer disclosed in Patent Document No. 1 accepts the mode setting that has been specified by the user and issues a command to change the power supply sources in accordance with his or her instruction.

As a result, an image input system, with which the user can transfer image data or make remote shooting without paying attention to the level of the battery or whether the AC adapter is connected or not, is provided.

The image input system disclosed in Patent Document No. 1 changes the power supplies for the digital camera depending on which of various modes of operation, including shooting and data transfer, is now selected. In this manner, the system can avoid an unwanted situation where the battery level is excessively low or where no AC power can be supplied, and can carry on shooting, retrieving image data from a memory card, and transferring it to the computer continuously.

CITATION LIST

Patent Literature

Patent Document No. 1: Japanese Patent Application Laid-Open Publication No. 2006-352255

SUMMARY OF INVENTION

Technical Problem

Generally speaking, power management is very important for any electronic device. Among other things, electronic devices to be driven with either an AC power supply or a battery will require even more sophisticated power management techniques. And power management on such an electronic device needs to be carried out differently depending on whether the power is supplied from the AC power supply or the battery. For example, if the battery level were insufficient, the operating voltage could not be supplied. Also, if the battery went empty during some operation such as a data transfer, then data would be partially lost. That is why these situations should be avoided in one way or another.

It is therefore an object of the present invention to provide an electronic device that can operate as long as possible even if the battery level is low and that can avoid an unexpected shutdown as much of the time as possible while data is being transmitted to, or received from, an external device.

Solution to Problem

An electronic device according to the present invention has a particular mode of operation in which the electronic device is connected to an external device and is able to accept a request to read and/or write information that has been sent by the external device. The electronic device includes: a battery; an interface, which is connected to the external device so as to get power from the external device and which accepts the request that has been sent by the external device; and a control section for changing conditions for enabling that particular mode of operation according to a supply value, which is at least one of the values of current and voltage supplied by the external device, and a value representing a level of the battery.

The control section may provide multiple conditions to be satisfied by the value representing the battery level to enable the particular mode of operation, and the control section may change the conditions depending on whether or not the supply value reaches a predetermined reference level.

The control section may provide first and second conditions as the conditions to be satisfied by the value representing the battery level, where the battery level required according to the first condition is lower than the level required according to the second condition. If the supply value reaches the reference level, the control section may determine whether or not the value representing the battery level satisfies the first condition in order to enable the particular mode of operation. And unless the supply value reaches the reference level, the control section may determine whether or not the value representing the battery level satisfies the second condition in order to enable the particular mode of operation.

If the supply value reaches the reference level but if the first condition is not satisfied or if the supply value is short of the reference level and if the second condition is not satisfied, then the control section may output an alert indicating that the particular mode of operation is disabled.

The supply value may be a current value representing the power supplied from the external device.

The electronic device may further include a first circuit block to be used in the particular mode of operation and a second circuit block not to be used in the particular mode of operation. When the external device is connected to the interface, the control section may initialize at least the first block.

The electronic device may further include an internal storage medium. When the particular mode of operation is enabled, the control section may read and/or write information using at least one of the internal storage medium and a removable storage medium.

A method according to the present invention is a method for controlling an electronic device having a particular mode of operation in which the electronic device is connected to an external device and is able to accept a request to read and/or write information that has been sent by the external device. The electronic device includes: a battery; and an interface, which is connected to the external device so as to get power from the external device and which accepts the request that has been sent by the external device. The method includes the steps of: getting a supply value, which is at least one of the values of current and voltage supplied by the external device, and a value representing a level of the battery; and changing conditions for enabling that particular mode of operation according to the supply value and the value representing the battery level.

A computer program according to the present invention is executed by a computer for an electronic device, which has a particular mode of operation in which the electronic device is connected to an external device and is able to accept a request to read and/or write information that has been sent by the external device. The electronic device includes: a controller functioning as the computer; a battery; and an interface, which is connected to the external device so as to get power from the external device and which accepts the request that has been sent by the external device. The computer program causes the controller to execute the steps of: getting a supply value, which is at least one of the values of current and voltage supplied by the external device, and a value representing a level of the battery; and changing conditions for enabling that particular mode of operation according to the supply value and the value representing the battery level.

A storage medium according to the present invention has stored thereon the computer program of the present invention described above.

Advantageous Effects of Invention

The present invention provides an electronic device that can operate as long as possible even if the battery level is low and that can avoid an unexpected shutdown as much of the time as possible while data is being transmitted to, or received from, an external device.

BRIEF DESCRIPTION OF DRAWINGS

FIG. 4 is a flowchart showing the procedure of a mass storage mode startup operation.

DESCRIPTION OF EMBODIMENTS

Figure 1:
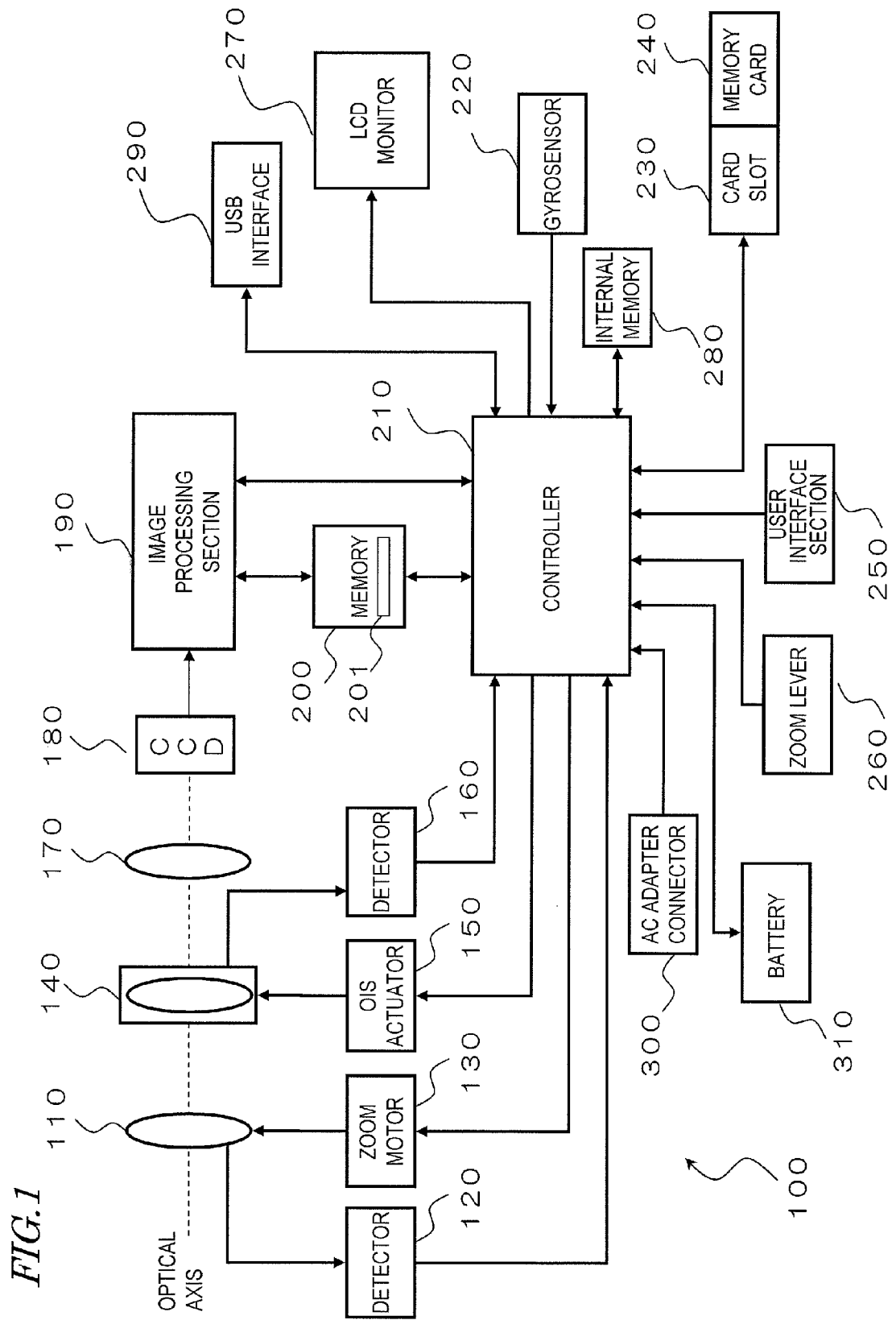
FIG. 1 is a block diagram illustrating a configuration for a digital camcorder 100.

Hereinafter, a preferred embodiment of an electronic device according to the present invention will be described with reference to the accompanying drawings. In the following description of preferred embodiments, the electronic device of the present invention is supposed to be implemented as a digital camcorder.

1. Outline

The digital camcorder 100 includes a USB interface 290 and can be supplied with power by an external device such as a personal computer (PC) that is connected to the USB interface 290. The external device can access a memory card 240 loaded in the digital camcorder 100 that is connected to the external device via the USB interface 290.

The digital camcorder 100 can operate as long as possible even if the battery level is low and can avoid an unexpected shutdown as much of the time as possible while data is being transmitted to, or received from, the external device.

2. Configuration (2-1. Electrical Configuration)

The electrical configuration of the digital camcorder 100 as a specific preferred embodiment of the present invention will be described with reference to FIG. 1, which is a block diagram illustrating a configuration for the digital camcorder 100. This digital camcorder 100 is designed to make a CCD image sensor 180 capture a subject image that has been produced by an optical system including a zoom lens 110. The image data that has been generated by the CCD image sensor 180 is subjected by an image processing section 190 to various kinds of processing and then stored in a memory card 240. If necessary, the image data stored in the memory card 240 can be displayed on an LCD monitor 270. Hereinafter, the configuration of this digital camcorder 100 will be described in detail.

The optical system of this digital camcorder 100 is made up of a zoom lens 110, an optical image stabilizer (OIS) 140, and a focus lens 170. The zoom lens 110 is driven to move along the optical axis of the optical system and thereby zoom in on, or out, the subject image. The focus lens 170 is driven to move along the optical axis of the optical system, thereby adjusting the focal length to the subject.

The OIS 140 includes a stabilizer lens that can move internally within a plane that intersects with the optical axis at right angles. Specifically, in the OIS 140, the stabilizer lens is driven in such a direction as to cancel the shake of the digital camcorder 100, thereby stabilizing the subject image.

The zoom motor 130 drives the zoom lens 110. The zoom motor 130 may be implemented as a pulse motor, a DC motor, a linear motor or a servo motor, for example. If necessary, the zoom motor 130 may drive the zoom lens 110 via a cam mechanism, a ball screw, or any other appropriate mechanism. The detector 120 detects the position of the zoom lens 110 on the optical axis. As the zoom lens 110 moves in the optical axis direction, the detector 120 outputs a signal representing the position of the zoom lens through a switch such as a brush.

The OIS actuator 150 drives the stabilizer lens in the OIS 140 within a plane that intersects with the optical axis at right angles. The OIS actuator 150 may be implemented as a planar coil or an ultrasonic motor. The detector 160 senses how much the stabilizer lens has moved in the OIS 140.

The CCD image sensor 180 captures the subject image, which has been produced by the optical system including the zoom lens 110, thereby generating image data. The CCD image sensor 180 performs exposure, transfer, electronic shuttering and various other kinds of operations.

The image processing section 190 subjects the image data that has been generated by the CCD image sensor 180 to various kinds of processing. For example, the image processing section 190 processes the video data that has been generated by the CCD image sensor 180, thereby generating either image data to be displayed on the LCD monitor 270 or image data to be stored back into the memory card 240 again. The image processing section 190 may also subject the image data that has been generated by the CCD image sensor 180 to gamma correction, white balance correction, flaw correction and various other sorts of processing. Furthermore, the image processing section 190 also compresses the image data that has been generated by the CCD image sensor 180 in a compression format compliant with the H. 264 standard or the MPEG-2 standard. The image processing section 190 may be implemented as a DSP or a microcomputer.

The controller 210 performs an overall control on all of these components of the digital camcorder 100. The controller 210 may be implemented as a semiconductor device, for example, but could also be implemented as either only a single piece of hardware or a combination of hardware and software. For example, the controller 210 could be a microcomputer.

The memory 200 functions as a work memory for the image processing section 190 and the controller 210, and may be implemented as a DRAM or a ferroelectric memory, for example. In the memory 200, stored is a computer program 201 that enables the controller 210 to perform the processing to be described later.

The LCD monitor 270 can display an image represented by the image data that has been generated by the CCD image sensor 180 and an image represented by the image data that has been retrieved from the memory card 240.

The gyrosensor 220 may be implemented as a kind of vibrating member such as a piezoelectric transducer. Specifically, the gyrosensor 220 vibrates the vibrating member such as a piezoelectric transducer at a constant frequency and transforms the Coriolis force produced into a voltage, thereby obtaining angular velocity information. Then, the controller 210 gets the angular velocity information from the gyrosensor 220 and gets the stabilizer lens driven in the OIS in such a direction that will cancel that shake. As a result, the shake of the digital camcorder 100 that has been generated by the user's hand or body tremors can be canceled.

The memory card 240 can be readily inserted into, or removed from, this digital camcorder 100 through a card slot 230, which is connectable both mechanically and electrically to the memory card 240. The memory card 240 includes a flash memory or a ferroelectric memory inside, and can store data.

The internal memory 280 may be a flash memory or a ferroelectric memory, for example, and stores a control program for performing an overall control on this digital camcorder 100. That control program will be loaded as the computer program 201 into the memory 200.

The user interface section 250 is a member for accepting the user's instruction to capture an image. The zoom lever 260 is a member for accepting the user's instruction to change the zoom power.

The USB interface 290 is an interface that connects this digital camcorder 100 to an external device such as a PC. The USB interface 290 of the digital camcorder 100 and an external device such as a PC may be connected together with a USB cable, for example. The digital camcorder 100 can be supplied with power, or receive data, from such an external device by way of the USB interface 290.

The AC adapter connector 300 is an interface that connects this digital camcorder 100 to an AC adapter. The AC adapter connector 300 of this digital camcorder 100 and an AC outlet may be connected together with the AC adapter, for example. Thus, the digital camcorder 100 can be supplied with power from the AC adapter through the AC adapter connector 300.

The battery 310 is a rechargeable battery to supply power to the digital camcorder 100. In this digital camcorder 100, the rechargeable battery may be a lithium ion battery. However, the battery 310 does not always have to be a lithium ion battery but may also be a nickel hydrogen battery or a nickel cadmium battery, for example. In short, any rechargeable battery may be used as the battery 310.

3. Operation

Hereinafter, the various modes of operation of the digital camcorder 100 of this preferred embodiment will be described with reference to the accompanying drawings.

[3-1. USB Connection Startup Sequence]

First of all, the USB connection startup sequence of this digital camcorder 100 will be described with reference to FIG. 2, which is a flowchart showing the USB connection startup sequence.

First, in Step S100, the user can connect a USB cable that is already connected to an external device such as a PC to this digital camcorder 100. The connection of the USB cable to this digital camcorder 100 triggers off the following operation of the digital camcorder 100.

And when the USB cable is connected to the digital camcorder 100, the controller 210 determines, in Step S110, whether the power switch of the user interface section 250 is in OFF state. It should be noted that even if the power switch is in OFF state, some blocks in the controller 210 (which will be referred to herein as "charging blocks") are supplied with power. By using that power supplied, the controller 210 can perform the processing shown in FIG. 2.

On finding the power switch OFF, the controller 210 sets out a charge mode startup operation in Step S120. On the other hand, on finding the power switch not in OFF state, the controller 210 sets out a mass storage mode startup operation in Step S130.

Hereinafter, the charge mode startup operation and the mass storage mode startup operation will be described with reference to FIGS. 3 and 4.

As used herein, the "charge mode" refers to either a mode in which a charge operation is performed using an AC adapter or a DC adapter or a mode in which a charge operation is performed by drawing power from an external device (such as a PC) that is connected via the USB interface 290. On the other hand, the "mass storage mode" refer herein to a mode of operation in which the digital camcorder 100 accepts a request that has been received from an external device (such as a PC) connected through the USB interface 290 to access its removable or non-removable storage medium, which is at least one of the memory 200, the internal memory 280 and the memory card 240. The external device recognizes the digital camcorder 100 as a drive such as a hard disk drive. By issuing a read request and/or a write request, the external device can read and/or write information from/on the storage medium.

[3-2. Charge Mode Startup Operation]

Next, the charge mode startup operation will be described with reference to FIG. 3, which is a flowchart showing the procedure of the charge mode startup operation.

On setting out the charge mode startup operation, the controller 210 initializes a USB block in Step S210. As used herein, the "USB block" refers to a combination of hardware components and a software program that are engaged in performing the USB function of this digital camcorder 100. For example, the USB block includes minimum required circuits and software for being supplied with power from an external device such as a PC and transmitting and receiving data to/from it. Also, "to initialize the USB block" herein means that the digital camcorder 100 initializes the USB block. That is to say, the digital camcorder 100 starts up the USB block in the inactive state, and resets various settings of the USB block, thereby initializing the USB block.

When finishing initializing the USB block, the controller 210 enters into USB initial communications in Step S220. As used herein, the "USB initial communications" refer to an operation to be performed by the digital camcorder 100 when it is connected to an external device such as a PC with a USB cable. More specifically, by establishing the USB initial communications, the digital camcorder 100 informs the PC or any other external device of its own functions or features or checks out the current drivability of the PC or any other external device. The exact method of checking out the current drivability is defined in the USB standards, and a detailed description thereof will be omitted herein.

On completing the initial communications, the controller 210 determines, based on the result of the initial communications, whether or not a current of 500 mA can be drawn from the external device connected (in Step S230).

If the answer is NO, the controller 210 cuts off the power being supplied to the body in Step S240. As used herein, "to cut off the power being supplied to the body" means stopping supplying power to the entire digital camcorder 100 but the charge block in the controller 210. When cutting off the power being supplied to the body, the controller 210 determines in Step S250 whether or not any AC adapter is connected to the AC adapter connector 310. This decision can be made by checking out the voltage being applied to the AC adapter connector 310, for example. On finding any AC adapter connected, the controller 210 starts charging using the AC adapter in Step S260. More specifically, the controller 210 sets a current value for performing a charge operation with an AC adapter with respect to a charge controller (IC) that operates in the controller 210 during charging. That current value is set to be greater than 50 mA, e.g., 1,000 mA. When this setting is done, a charge operation using the current value that has been set is started with the AC adapter.

On the other hand, on finding no AC adapter connected, the controller 210 does not start the charge operation using the USB interface 290 but indicates an error by blinking a power LED (not shown) of the digital camcorder 100, thereby entering a charge error state (in Step S270).

On the other hand, if the answer to the query of the processing step S230 is YES, then the controller 210 makes USB charge settings in Step S280. As used herein, "to make USB charge settings" means setting a current value for the controller 210 to make USB charging for a charge control circuit (IC) in the controller 210. On finishing the USB charge settings, the controller 210 cuts off the power being supplied to the body in Step S290. After that, the controller 210 determines in Step S300 whether or not any AC adapter is connected to the AC adapter connector 310. If the answer is YES, the controller 210 starts charging using the AC adapter in Step S310. Otherwise, the controller 210 starts charging through the USB interface 290 in Step S320. In that case, the controller 210 starts charging by drawing a current of 500 mA through the USB interface 290.

Thus, even if finding any AC adapter connected when setting out a charge mode startup operation with a USB cable connected, the digital camcorder 100 of this preferred embodiment once initializes its own USB interface 290 and makes initial communications through the USB interface 290. Then, after having initialized the USB interface 290 and made the initial communications, the digital camcorder 100 cuts off power being supplied to the entire controller 210 except the charge block and then starts charging using the AC adapter.

That is why even if the digital camcorder 100 that is connected to both an AC adapter and a USB cable and that is being charged through the AC adapter is suddenly disconnected from the AC adapter, the digital camcorder 100 can start being charged through the USB cable immediately without initializing the USB block or making USB initial communications. Consequently, even in such a situation, the digital camcorder 100 can start the charge operation quickly through the USB interface 290.

Also, if only a current of less than 500 mA can be drawn from an external device such as a PC that is connected through a USB cable and if no AC adapter is connected thereto, then the digital camcorder 100 makes no charging through the USB interface 290. This measure is taken for the following reasons:

When the battery 310 starts being charged, the power LED (not shown) blinks to indicate that charging is now in progress. For example, suppose charging should still be done through the USB interface 290 even if only a small amount of drawn current is available from the external device. In that case, the power LED will blink in the same way, no matter whether the amount of drawn current is sufficient or not. By seeing if the power LED has stopped blinking, the user determines whether the battery 310 has been fully charged or not. That is why if charging were made through the USB interface 290 even though only a small amount of drawn current is available and if the power LED were made to blink as in a situation where plenty of drawn current is available, then the user could not predict when the battery 310 will be charged fully. On top of that, even if charging through the USB interface 290 were attempted when there is very little drawn current available from the external device, then it would take a lot of time to get the battery 310 charged fully or it could also be impossible to do charging in the first place. For these reasons, if only a drawn current of less than 500 mA is available from an external device such as a PC that is connected to this digital camcorder 100 with a USB cable and if no AC adapter is connected thereto, then the digital camcorder 100 does not make charging through the USB interface 290.

Meanwhile, if the digital camcorder 100 is connected to both an AC adapter and a USB cable that is connected to an external device, then the digital camcorder 100 charges the battery 310 with the power being supplied through the AC adapter. This is because a greater amount of current can be drawn through the AC adapter than from the external device that is connected through the USB interface 290. By charging the battery 310 with the power being supplied through the AC adapter, the digital camcorder 100 can get the battery 310 fully charged in a shorter time than by charging the battery 310 through the USB interface 290.

Recently, adapters for making USB power supply through an AC outlet have become more and more popular. With such an adapter, although a USB cable is connected to the USB interface 290, the initial communications in the processing step S220 shown in FIG. 3 cannot be done. In other words, if the USB initial communications cannot be done in the processing step S220, then it may be determined in Step S230 that this device is connected to an AC outlet and then the process may advance to Step S240 or S280.

[3-3. Mass Storage Mode Startup Operation]

Next, the mass storage mode startup operation will be described with reference to FIG. 4, which is a flowchart showing the procedure of the mass storage mode startup operation.

On setting out the mass storage mode startup operation, the controller 210 initializes the USB block in Step S310. In this case, the power SW of the digital camcorder 100 has been turned ON and the USB has already been activated. That is why the controller 210 resets various settings of the USB block, thereby initializing the USB block.

When finishing initializing the USB block, the controller 210 enters into USB initial communications in Step S320. As used herein, the "USB initial communications" refer to an operation to be performed by the digital camcorder 100 when it is connected to an external device such as a PC with a USB cable. More specifically, by establishing the USB initial communications, the digital camcorder 100 informs the PC or any other external device of its own functions or features or checks out the current drivability of the PC or any other external device.

On completing the initial communications, the controller 210 determines, based on the result of the initial communications, whether or not a current of 500 mA can be drawn from the external device connected (in Step S330).

If the answer is YES, the controller 210 determines whether or not the battery 310 has a level of 10% or more (in Step S350). The level of the battery 310 can be determined by any of various methods. For example, if the battery 310 is a smart battery with the function of indicating the battery level, then the controller 210 may determine the level of the battery 310 in accordance with the information provided by the smart battery. On the other hand, if the battery 310 is not a smart battery, then the controller 210 may determine the battery level by the voltage value of the battery.

If the battery 310 has a level of 10% or more, then the controller 210 instructs the USB interface 290 in Step S360 to operate in the mass storage mode. In that case, the digital camcorder 100 is operating by drawing a current of 500 mA from the external device by way of the USB interface 290. On the other hand, if the battery level has turned out to be less than 10%, then the controller 210 instructs the LCD monitor 270 in Step S370 to output (or display) an alert indicating that the device cannot operate in the mass storage mode due to the low battery level and also instructs the USB interface 290 not to operate in the mass storage mode. In that case, the digital camcorder 100 is operating by drawing a current of 500 mA from the external device by way of the USB interface 290.

Meanwhile, if its has been determined in Step S330 that a current of 500 mA cannot be drawn from the external device connected, then the controller 210 determines whether or not the battery 310 has a level of 20% or more (in Step S390). If the answer is YES, then the controller 210 instructs the USB interface 290 in Step S400 to operate in the mass storage mode. In that case, the digital camcorder 100 does not draw current from the external device by way of the USB interface 290.

On the other hand, if the battery level has turned out to be less than 20%, then the controller 210 instructs the LCD monitor 270 in Step S410 to output (or display) an alert indicating that the device cannot operate in the mass storage mode due to the low battery level and also instructs the USB interface 290 not to operate in the mass storage mode. In that case, the digital camcorder 100 does not draw current from the external device by way of the USB interface 290.

As can be seen, if the digital camcorder 100 of this preferred embodiment is connected to an external device via the USB interface 290, the minimum required level of the battery 310 for the USB interface 290 to perform the mass storage mode operation is changed according to the amount of current that can be drawn from the external device. More specifically, the controller 210 provides multiple conditions to be satisfied by the level of the battery 310 in order to enable the mass storage mode. And the controller 210 changes the conditions depending on whether or not the amount of current that can be drawn from the external device reaches a predetermined reference level. Specifically, if the amount of drawn current available from the external device is greater than a predetermined value (of 500 mA in this example), the condition given is that the battery 310 should have a minimum required level of 10%. On the other hand, if the amount of drawn current available from the external device is less than the predetermined value, the condition given is that the battery 310 should have a minimum required level of 20%. The controller 210 may retain the values specifying these conditions given in either an internal register (not shown) or the internal memory 280. In any case, those values may be retained and maintained so that the controller 210 can access those values.

According to this processing method, if some current is drawn from the external device, the digital camcorder 100 does operate in the mass storage mode even when the level of the battery 310 is rather low. However, if no current is drawn from the external device and if the level of the battery 310 is short of the predetermined level, the digital camcorder 100 does not operate in the mass storage mode. As a result, the digital camcorder 100 can operate as long as possible even if the battery level is low and can avoid an unexpected shutdown as much of the time as possible while data is being transmitted to, or received from, the external device.

Although the present invention has been described by way of illustrative preferred embodiments, those preferred embodiments are only examples and the present invention is in no way limited to those specific preferred embodiments. Thus, some modified examples of this preferred embodiment will be described.

The optical system and drive system of the digital camcorder 100 of the preferred embodiment shown in FIG. 1 are just examples and do not always have to be used. For example, in the preferred embodiment illustrated in FIG. 1, the optical system is supposed to consist of three groups of lenses. However, the optical system may also consist of any other number of groups of lenses. Furthermore, each of those lenses may be either a single lens or a group of multiple lenses.

Also, in the preferred embodiment of the present invention described above, the imager is supposed to be the CCD image sensor 180. However, the present invention is in no way limited to that specific preferred embodiment. Alternatively, the imager may also be a CMOS image sensor or an NMOS image sensor.

In the preferred embodiment described above, in Steps S350 and S390 shown in FIG. 4, it is determined by the level of the battery 310 whether or not the device may operate in the mass storage mode. However, this is just an example of the present invention. Alternatively, it may also be determined, by seeing if the voltage value of the battery 310 is a equal to or greater than a predetermined value, whether the device may operate in the mass storage mode or not. In that case, even if the battery 310 is not a smart battery, there is no need to determine the battery level by the voltage value. Nevertheless, both the battery level and the voltage value can be said to be "values representing the battery level". For that reason, the battery level, the voltage and other values that can represent the battery level will sometimes be collectively referred to herein as "battery related values".

Also, in the preferred embodiment described above, the predetermined amount of current, by which it is determined whether the charge mode startup operation may be performed or not, is supposed to be 500 mA. However, the present invention is in no way limited to that specific preferred embodiment. Alternatively, the predetermined amount of current may also be 100 mA, 200 mA or whatever as long as the amount of current is large enough to start up a block to be used for charging.

Furthermore, in the preferred embodiment described above, the amount of the drawn current available, by which it is determined whether the device may operate in the mass storage mode or not, and the amount of the drawn current available, by which it is determined whether the device may perform the charge mode startup operation or not, are both supposed to be 500 mA. However, this is only an example of the present invention. For example, the amount of drawn current for determining whether the device may operate in the mass storage mode or not may be 100 mA and the amount of drawn current for determining whether the device may perform the charge mode startup operation or not may be 500 mA. In this manner, two different current values may be set and used to make the respective decisions independently of each other.

Optionally, those decisions may also be made based on voltage values, instead of current values. And current values and/or voltage values may be used to make those decisions.

Furthermore, in the preferred embodiment described above, the level of the battery 310, which is used as a condition for determining whether the device may operate in the mass storage mode or not, is supposed to be either at least 10% or at least 20% according to the current drivability of the PC or any other external device connected. However, the present invention is in no way limited to that specific preferred embodiment. For example, if it has been determined that a current of 500 mA can be drawn from the external device connected and if the battery has a level of at least 5%, then the camcorder may operate in the mass storage mode. On the other hand, if it has been determined that a current of 500 mA cannot be drawn but if the battery has a level of at least 15%, then the camcorder may also operate in the mass storage mode. In any case, the minimum required battery level when a predetermined amount of current turns out to be available from the external device just needs to be smaller than the minimum required battery level when the predetermined amount of current turns out to be not available from the external device.

Also, in the preferred embodiment described above, when the charge mode startup operation is performed, only the minimum required block for activating the USB interface 290 is supposed to be initialized. However, this is only an example of the present invention. Alternatively, the entire camcorder may be initialized as well.

Furthermore, in the preferred embodiment described above, the medium for connecting the digital camcorder 100 and the external device together is supposed to be a USB cable. However, this is only an example of the present invention. Alternatively, the digital camcorder 100 may also be connected wirelessly to a power transmitter that transmits electric power and data by magnetic resonant coupling. Or the digital camcorder 100 may also be connected with a different kind of cable. In short, any interface may be used as long as it enables the digital camcorder 100 to get power from some other source.

Also, in the preferred embodiment described above, the present invention is supposed to be applied to a digital camcorder. However, the present invention is also applicable to digital still cameras, cellphones, personal computers and portable music players, not just digital camcorders.

Figure 2:
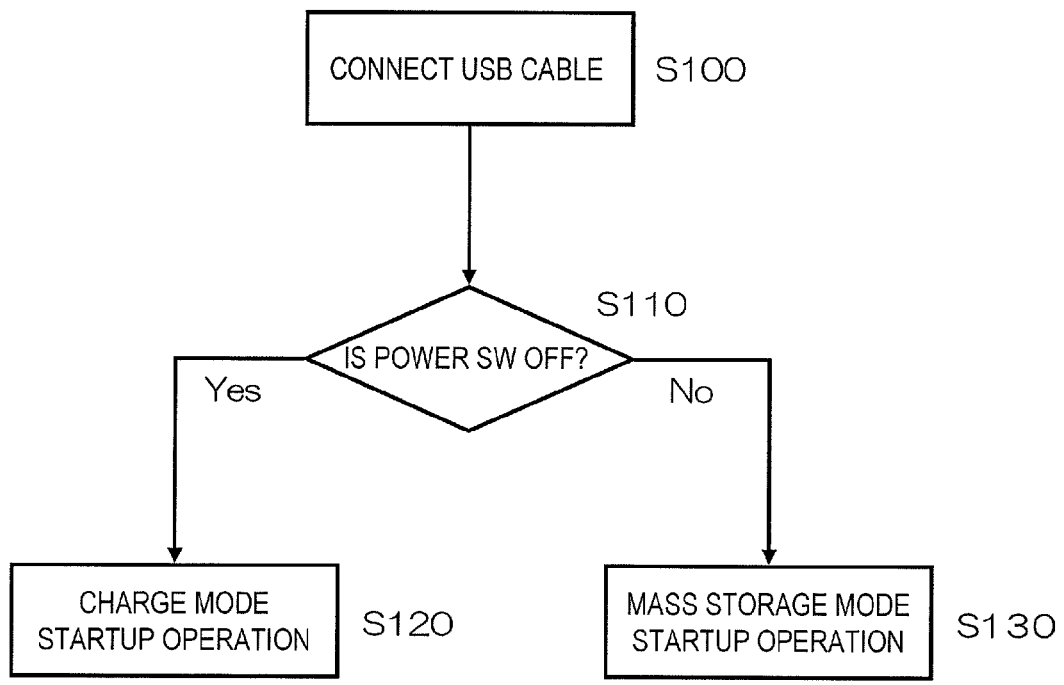
FIG. 2 is a flowchart showing a USB connection startup sequence.
Figure 3:
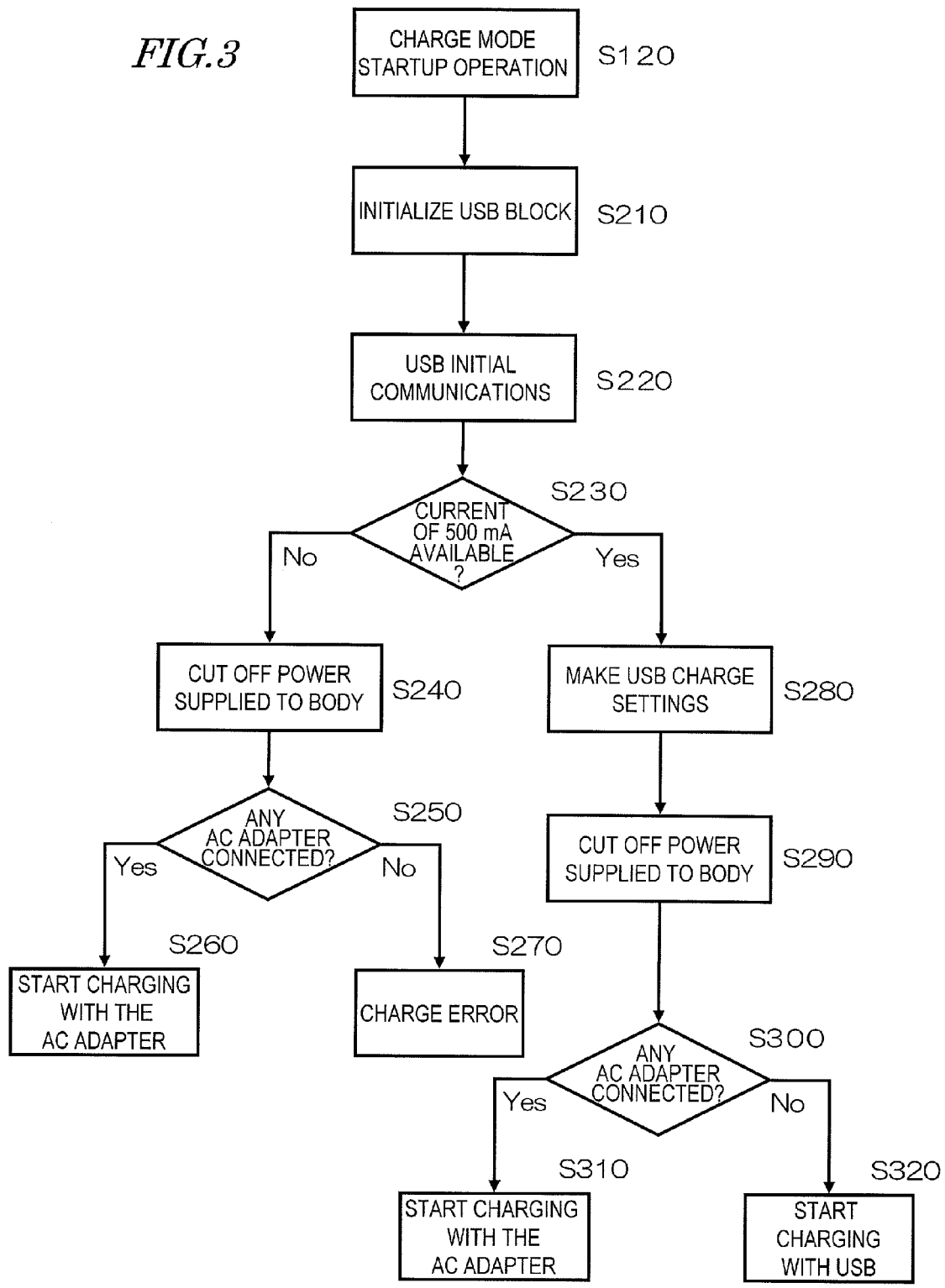
FIG. 3 is a flowchart showing the procedure of a charge mode startup operation.

The computer program to be executed by the digital camcorder 100 as described above is defined to make the controller 210 perform the respective processing steps in the procedures shown in FIGS. 2 to 4. Such a computer program may be circulated on the market by being stored on a storage medium such as a CD-ROM or downloaded over telecommunications lines such as the Internet.

INDUSTRIAL APPLICABILITY

The present invention is applicable to digital camcorders, digital still cameras and other electronic devices.

REFERENCE SIGNS LIST 100 digital camcorder
110 zoom lens
120 detector
130 zoom motor
140 OIS
150 OIS actuator
160 detector
170 focus lens
180 CCD image sensor
190 image processing section
200 memory
210 controller
220 gyrosensor
230 card slot
240 memory card
250 user interface section
260 zoom lever
270 LCD monitor
280 internal memory

The invention claimed is:

1. An electronic device having a particular mode of operation in which the electronic device is connected to an external device and is able to accept a request to read and/or write information that has been sent by the external device, the electronic device comprising:
   a battery;
   an interface, which is connected to the external device so as to get power from the external device and which accepts the request that has been sent by the external device; and
   a control section for changing conditions for levels of the battery for enabling that particular mode of operation according to whether or not a supply value, which is at least one of the values of current and voltage supplied by the external device, reaches a predetermined reference level,
   wherein a plurality of conditions are set as the conditions for levels of the battery, the plurality of conditions including first condition;
   if the supply value reaches the predetermined reference level, the control section determines whether or not a value associated with the battery satisfies the first condition in order to enable the particular mode of operation; and
   if the first condition is satisfied, the control section enables the particular mode of operation, or if the first condition is not satisfied, the control section does not enable the particular mode of operation.

2. The electronic device of claim 1, wherein, as the conditions for levels of the battery, first and second conditions are retained, where the battery level required according to the first condition is lower than the level required according to the second condition, and
   wherein unless the supply value reaches the reference level, the control section determines whether or not the value associated with the battery satisfies the second condition in order to enable the particular mode of operation.

3. The electronic device of claim 2, wherein
   if the supply value reaches the reference level but if the first condition is not satisfied, or
   if the supply value is short of the reference level and if the second condition is not satisfied,
   then the control section outputs an alert indicating that the particular mode of operation is disabled.

4. The electronic device of claim 1, wherein the supply value is a current value representing the power supplied from the external device.

5. The electronic device of claim 1, further comprising a first circuit block to be used in the particular mode of operation and a second circuit block not to be used in the particular mode of operation,
   wherein when the external device is connected to the interface, the control section initializes at least the first block.

6. The electronic device of claim 1, further comprising an internal storage medium,
   wherein when the particular mode of operation is enabled, the control section reads and/or writes information using at least one of the internal storage medium and a removable storage medium.

7. A method for controlling an electronic device having a particular mode of operation in which the electronic device is connected to an external device and is able to accept a request to read and/or write information that has been sent by the external device, the electronic device comprising: a battery; and an interface, which is connected to the external device so as as to get power from the external device and which accepts the request that has been sent by the external device, wherein the method comprises the steps of:

getting a supply value, which is at least one of the values of current and voltage supplied by the external device;

changing conditions for levels of the battery for enabling that particular mode of operation according to whether or not the supply value reaches a predetermined reference level;

setting a plurality of conditions as the conditions for levels of the battery, the plurality of conditions including first condition;

determining whether or not a value associated with the battery satisfies the first condition in order to enable the particular mode of operation if the supply value reaches the predetermined reference level; and enabling the particular mode of operation if the first condition is satisfied, or not enabling the particular mode of operation if the first condition is not satisfied.

8. A non-transitory storage medium having stored thereon a computer program to be executed by a computer for an electronic device, the electronic device having a particular mode of operation in which the electronic device is connected to an external device and is able to accept a request to read and/or write information that has been sent by the external device, the electronic device comprising: a controller functioning as the computer; a battery; and an interface, which is connected to the external device so as to get power from the external device and which accepts the request that has been sent by the external device, wherein the computer program causes the controller to execute the steps of:

getting a supply value, which is at least one of the values of current and voltage supplied by the external device;

changing conditions for levels of the battery for enabling that particular mode of operation according to whether or not the supply value reaches a predetermined reference level;

setting a plurality of conditions as the conditions for levels of the battery, the plurality of conditions including first condition;

determining whether or not a value associated with the battery satisfies the first condition in order to enable the particular mode of operation if the supply value reaches the predetermined reference level; and enabling the particular mode of operation if the first condition is satisfied, or not enabling the particular mode of operation if the first condition is not satisfied.

\* \* \* \* \*